(12) United States Patent
Decker et al.

(10) Patent No.: US 12,536,701 B1
(45) Date of Patent: Jan. 27, 2026

(54) SPATIAL CALIBRATION FOR ACCURATE LONG-DISTANCE MEASUREMENT USING INFRARED CAMERAS

(71) Applicant: U.S. Government as Represented by the Secretary of the Army, Dover, NJ (US)

(72) Inventors: Ryan Decker, Lake Hopatcong, NJ (US); Benjamin Abruzzo, Newark, NJ (US); Ahmed Hassan, Boonton, NJ (US); Mihaly Horvath, Montville, NJ (US); Steven Manole, Great Meadows, NJ (US); Arhum Mirza, Vernon, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 59 days.

(21) Appl. No.: 18/442,762

(22) Filed: Feb. 15, 2024

Related U.S. Application Data

(60) Provisional application No. 63/445,794, filed on Feb. 15, 2023.

(51) Int. Cl.
*G06T 7/80* (2017.01)
*G01C 11/02* (2006.01)
(Continued)

(52) U.S. Cl.
CPC .............. *G06T 7/80* (2017.01); *G01C 11/02* (2013.01); *G01C 25/00* (2013.01); *H04N 17/002* (2013.01); *G06T 2207/10048* (2013.01)

(58) Field of Classification Search
CPC . G06T 7/80; G06T 2207/10048; G01C 11/02; G01C 25/00; H04N 17/002
See application file for complete search history.

(56) References Cited

U.S. PATENT DOCUMENTS

| 6,768,509 B1 * | 7/2004 | Bradski ..................... G06T 7/85 |
| | | 348/E13.016 |
| 10,460,511 B2 * | 10/2019 | Ondruska ............... G06T 7/579 |

(Continued)

FOREIGN PATENT DOCUMENTS

| CN | 115393449 | * | 8/2022 |
| CN | 115690228 | * | 10/2022 |

(Continued)

OTHER PUBLICATIONS

Wakai translation of JP2018179980 Mar. 29, 2018 (Year: 2018).*
(Continued)

*Primary Examiner* — Zaihan Jiang
(74) *Attorney, Agent, or Firm* — John P. DiScala

(57) ABSTRACT

A method for spatial calibration of an infrared (IR) camera allows for a large calibration area thereby providing high fidelity results for accurate long-distance measurement. Halogen lamps capable of being surveyed are spread over a relatively wide area to serve as calibration points for the infrared camera. The halogen lamps provide a precise and symmetric signature suitable for mid-wave IR cameras. An accurate model is developed for the radial and tangential distortion of the camera system. Likewise, values for the intrinsic parameters (focal lengths and optional skew coefficient) are measured to improve real-world measurements made using images recorded from a calibrated camera system.

13 Claims, 13 Drawing Sheets

(51) Int. Cl.
*G01C 25/00* (2006.01)
*H04N 17/00* (2006.01)

(56) References Cited

U.S. PATENT DOCUMENTS

| | | | |
|---|---|---|---|
| 10,565,555 B1* | 2/2020 | Kim | G06F 16/23 |
| 2018/0300900 A1* | 10/2018 | Wakai | G06T 7/85 |
| 2024/0048843 A1* | 2/2024 | Herman | H04N 9/73 |

FOREIGN PATENT DOCUMENTS

| | | | |
|---|---|---|---|
| JP | 2019005134 | * | 6/2017 |
| JP | 2018179980 | * | 3/2018 |
| JP | 2021111198 | * | 1/2020 |

OTHER PUBLICATIONS

Arata translation of JP2021111198 Jan. 14, 2020 (Year: 2020).*
Cao translation of CN115393449 Aug. 26, 2022 (Year: 2022).*
Sakamoto translation of JP2019005134 Jun. 23, 2017 (Year: 2017).*
Huang translation of CN 115690228 A Oct. 31, 2022 (Year: 2022).*
Eikenes, Anders, Intersection point of lines in 3D space (https://www.mathworks.com/matlabcentral/fileexchange/37192-intersection-point-of-lines-in-3d-space), Jun. 15, 2012, MATLAB Central File Exchange. Retrieved Feb. 9, 2024.

* cited by examiner

SPATIAL CALIBRATION FOR ACCURATE LONG-DISTANCE MEASUREMENT USING INFRARED CAMERAS

CROSS-REFERENCE TO RELATED APPLICATIONS

This application claims the benefit under 35 USC § 119(e) of U.S. provisional patent application 63/445,794 filed on Feb. 15, 2023.

STATEMENT OF GOVERNMENT INTEREST

The inventions described herein may be manufactured, used, and licensed by or for the United States Government.

FIELD OF THE INVENTION

The invention relates in general to photogrammetry and in particular to spatial calibration of optical systems for photogrammetry.

BACKGROUND OF THE INVENTION

Photogrammetric measurement, also known as photogrammetry, is the process of obtaining information about the physical world or a physical object from measuring photographic images. Photogrammetry has applications in numerous fields including land surveying, engineering, real estate, military intelligence, film and entertainment, forensics, and construction.

Accurate photgrammetric measurement relies on the accurate representation of the physical subject in the photographic image. Unfortunately, all commercially available camera systems cannot perfectly refract light waves and refocus them onto a two-dimensional (2D) image sensor due to their lenses and internal geometry. Even expensive high-fidelity lenses may only reduce measurable distortion but cannot eliminate the distortion.

Accordingly, all digital images contain elements of distortion and thus are not a true representation of the real world. If sufficient distortion is present, it will affect photogrammetric measurements made from the images produced by these systems. This is true regardless of the type of camera system, whether daylight camera, infrared (IR) camera, or camera sensitive to another part of the electromagnetic spectrum.

For a conventional camera and lens system the most common distortions may be classified as radial distortion or tangential distortion. Radial distortion is caused by the geometry of the camera lens. The most common examples of large-scale lens distortions are known as barrel and pincushion effects. In barrel effects, magnification decreases with distance from the optical axis thereby producing an image which appears to be mapped around a barrel. In pincushion effects, image magnification increases with the distance from the optical axis, thereby producing an image which is bowed toward the center. Tangential distortions occur when the lens and the image plane are not parallel.

Spatial calibration aims to build a transform to correct for large scale distortion effects in a camera system and effectively flatten a resulting image. A widely used spatial calibration tool was developed by Yvez-Bouquet et. al. This calibration tool is included with its own graphical user interface in the MATLAB Image Processing Toolbox available from Mathworks, Inc. of Natick, MA. This automated method makes use of a flat target board of any size with a checker pattern to estimate the intrinsic and extrinsic properties of a camera. This allows the conversion from 2D image coordinates to the 2D real world coordinates of the checkerboard intersections. During this process, a sequence of images is recorded of the target board from various angles and in various positions throughout the field of view. The operator can either use a stationary camera and move the target board or move the camera around a stationary target board. Sufficiently capturing the target at various angles is critical for estimating the camera extrinsic parameters of the camera system while sufficiently recording images of the target throughout the field of view is critical for accurately building a model of the camera distortion field.

However, while the Bouqet approach is useful for indoor laboratory settings with relatively short distances, it is not practical for long-distance outdoor applications due to the inability to construct large 2D calibration targets of sufficient flatness. Some photographic applications require that the focus distance of a camera lens be set to a long distance (greater than one hundred (100) meters (m)). This allows distant objects to appear sharply in focus. This is opposed to indoor laboratory environments where the focus may be set to a much closer distance. Some optical systems used for visual navigation or object tracking fall into the long-distance focus category. This may also apply to situations where far-away objects or features are tracked for the purposes of image stabilization. In long-range applications, the camera focus distance must be set to a far distance and replicating the setup at such distances is not feasible due to the size and flatness required for a target board at long distance. When the focus is set to a far distance (possibly approaching infinity), conventional methods for laboratory calibration are not feasible because the calibration targets required would be too large and placed too far away to fit indoors.

Short-range calibrations with small targets do not provide sufficient accuracy for long-range applications. Since a change in focus affects the intrinsic parameters of the camera and possibly the distortion model, it is necessary to perform a calibration at the focus at which measurements will be made.

In addition, there are issues with using this approach without modification for IR camera spatial calibration. For IR cameras, checkerboard patterns perform poorly as thermal bleeding of hot areas tends to occur in a radial pattern, making it difficult to precisely locate the corners.

Other approaches commonly used for IR camera spatial calibration have been developed, specifically for networks of IR cameras used in laboratory environments. In these situations, a wand with an IR reflector can be moved about (without knowing its true position) and algorithms are used to simultaneously calibrate the entire network of cameras. This approach would be extremely difficult to replicate in a large-scale outdoor environment with only one or two camera systems, which may be set to long focus distances.

A need exists for a method of calibrating IR cameras for photographic applications which require that the focus of a camera lens be set to a long distance.

SUMMARY OF THE INVENTION

One aspect of the invention is a method for conducting spatial calibration of a camera system. The method comprises the steps of: providing a camera system and a plurality of calibration points at a desired distance from the camera system; for each of the plurality of calibration points, surveying a measured location of the calibration point;

surveying a measured location of the camera system; recording a plurality of calibration images by the camera system; processing the plurality of the calibration images to identify relevant information within the calibration image; and determining one or more camera calibration parameters from the relevant information of the processed calibration images and the measured location of the camera system and the measured location of each of the plurality of calibration points.

The invention will be better understood, and further objects, features and advantages of the invention will become more apparent from the following description, taken in conjunction with the accompanying drawings.

BRIEF DESCRIPTION OF DRAWINGS

In the drawings, which are not necessarily to scale, like or corresponding parts are denoted by like or corresponding reference numerals.

DETAILED DESCRIPTION OF THE INVENTION

A method for spatial calibration of an infrared (IR) camera system allows for a large calibration area thereby providing high fidelity results for accurate long-distance measurement. Halogen lamps capable of having their location surveyed are spread over a relatively wide area to serve as calibration points for the infrared camera system. The halogen lamps provide a precise and symmetric signature suitable for calibration of a mid-wave IR camera systems.

The method employs a calibration setup to develop an accurate model for the radial and tangential distortion of the camera system. Likewise, values for the intrinsic parameters, focal lengths, and optional skew coefficient, are measured to improve real-world measurements made using images recorded from a calibrated camera system. Alternatively, the method can be used, with or without distortion correction, to convert from pixel coordinates to angular measurements.

The method is particularly useful for applications where the camera focus distance is to be set at a far distance. Indoor calibration methods are not useful in such applications due to poor application of short distance calibrations to long-distance images.

While the method is described throughout in the context of conducting spatial calibration of an IR camera system, the method is not limited to IR camera systems. In other embodiments, the method may be adapted to camera systems of other wavelengths of electromagnetic radiation such as visible light camera systems. In such embodiments, those skilled in the art will recognize that the calibration points will comprise sources of electromagnetic radiation at the desired wavelength.

Figure 1:
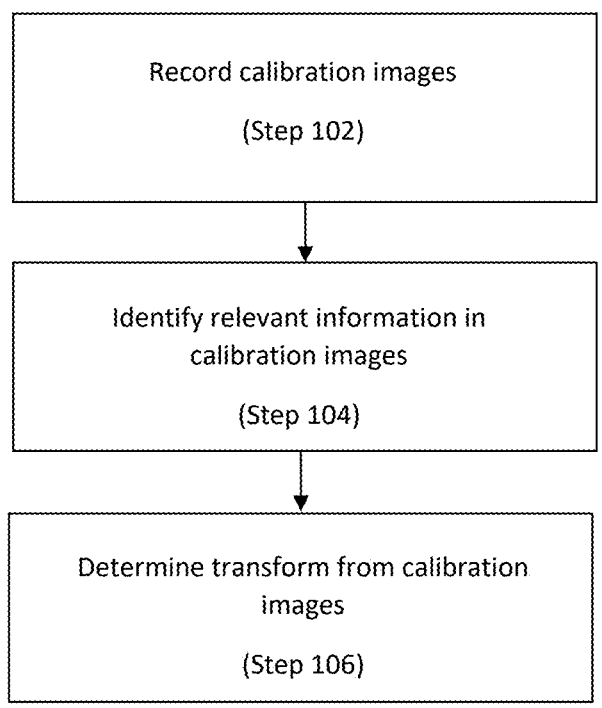
FIG. 1 is a flowchart illustrating a method for spatial calibration of an optical system, according to an embodiment.

FIG. 1 is a flowchart illustrating a method for spatial calibration of an optical system, according to an embodiment. At step 102, a plurality of calibration images is recorded by the optical system, or camera system. To record the calibration images, a calibration setup is prepared, various points within the system are surveyed and the camera system records images at varying orientations.

At step 104, the calibration images are processed to identify the relevant information within the calibration images. Image processing may include calibration point identification. Image processing may also comprise processing to identify and correct false positives and false negatives.

At step 106, camera calibration parameters are determined from the calibration images and surveyed locations of the camera system and calibration points. The camera calibration parameters can be applied to uncorrected images to correct for the distortions caused by intrinsic factors. Camera calibration parameters can also be utilized to extract the camera position and orientation history. Camera calibration parameters include but are not limited to distortion model parameters, camera intrinsic parameters, and extrinsic parameters for each individual frame captured during the calibration recording process. Throughout this specification, the terms measured location, surveyed location and true location may be used interchangeably to denote the location that is surveyed.

Figure 2:
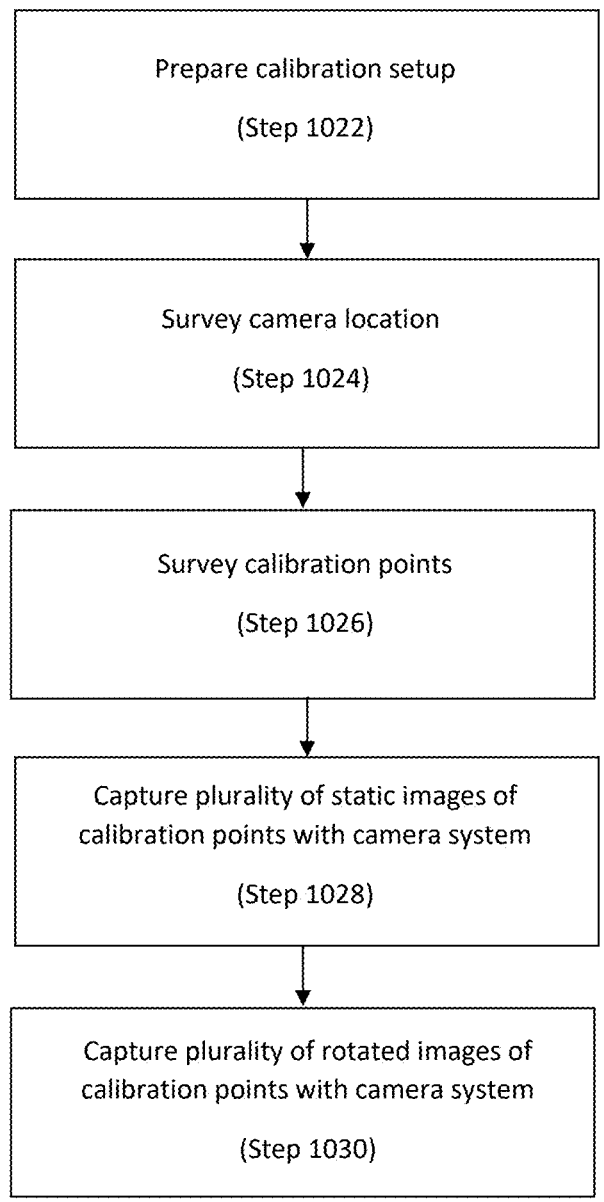
FIG. 2 is a flowchart illustrating a method for recording calibration images by the camera system, according to an embodiment.

FIG. 2 is a flowchart illustrating a method for recording calibration images by the camera system, according to an embodiment.

At step 1022, a calibration setup is prepared.

Figure 3:
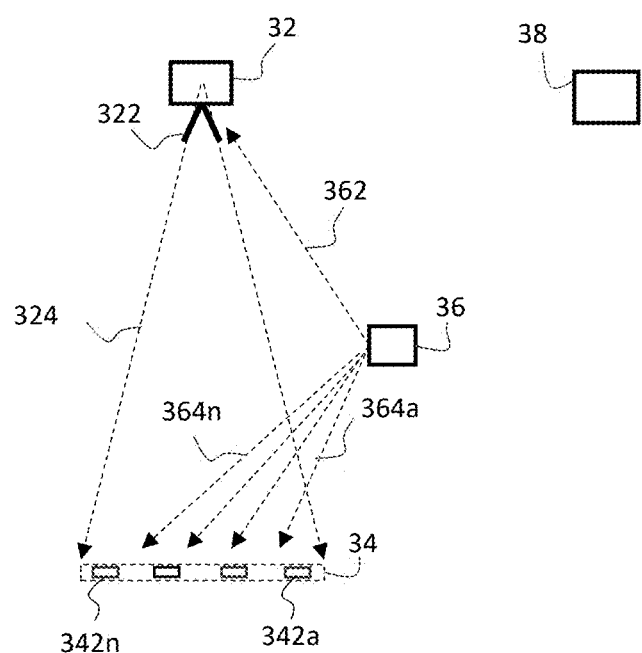
FIG. 3 shows a top elevation view of a system for conducting spatial calibration of an IR camera, according to an illustrative embodiment.

FIG. 3 shows a top elevation view of a system for conducting spatial calibration of an IR camera, according to an illustrative embodiment. The calibration setup comprises an IR camera system 32 and a calibration point assembly 34 comprising a plurality of IR calibration points 342a,n spread over a relatively large calibration area 34 on a projected surface at a desired distance from the camera system 32. The calibration points need not be contained on the same 2D plane as is required for prior art methods. Further, the calibration points need not be uniformly spaced. The camera system comprises the camera, lens and supporting gimbal system 322. The location of the camera system 32 is set a distance from the calibration points 342$a,n$ to allow for an accurate calibration of the camera system 32 at a desired focus distance. The camera system 32 is also positioned such that there is a clear line of sight 324 between the camera system 32 and the calibration area 34.

A gimbal system 322 supports the camera system 32 at the effective focal point. The gimbal system 322 alleviates the time-consuming burden of surveying the camera system location for each of hundreds of images at slightly different orientations. The gimbal system allows the camera system 32 to rotate in two directions (pitch and yaw) and restricts the roll angle and all translational degrees of freedom. The gimbal system may also be equipped with an array of four survey stickers equidistant from the center of rotation which improves the precision (and confidence) of surveying the location of the camera system 32.

The system further comprises a survey theodolite 36 for surveying the locations of the camera system 32 and the calibration points 342$a,n$. The survey theodolite 36 is positioned such that there is a clear line of sight 362 between the survey theodolite 36 and the camera system 32 and a clear line of sight 364$a,n$ between the survey theodolite 36 and the calibration points 342$a,n$.

A computer device 38 is configured for receiving inputs in the form of recorded images and measured locations of the camera system and calibration points and determining the camera calibration parameters. The computer device 38 may be a personal computer, tablet computer, mobile phone or any other device comprising a central processing unit and memory.

The computer device 38 includes at least one central processing unit (CPU). For example, the CPU may represent one or more microprocessors, and the microprocessors may be "general purpose" microprocessors, a combination of general and special purpose microprocessors, or application specific integrated circuits (ASICs). Additionally, or alternatively, the CPU may include one or more reduced instruction set (RISC) processors, or related chip sets. The CPU may provide processing capability to execute an operating system, run various applications and executables, and/or provide processing for one or more of the techniques described herein.

A main memory may be communicably coupled to the CPU, which may store data and executable code. The main memory may represent volatile memory such as RAM, but may also include nonvolatile memory, such as read-only memory (ROM) or Flash memory. In buffering or caching data related to operations of the CPU, the main memory may store data associated with executables running on the computer device 38.

The computer device 38 may also include nonvolatile storage. The nonvolatile storage may represent any suitable nonvolatile storage medium, such as a hard disk drive or nonvolatile memory, such as Flash memory. Being well-suited to long-term storage, the nonvolatile storage may store data files and software.

It should be appreciated that data associated with measured locations and recorded images may be saved in the nonvolatile storage. Non-volatile storage may include one or more software engines operable to enable the processing of image data and determination of the camera calibration parameters as well as perform other operations. Depending upon implementation, various aspects of teachings of the present invention may be implemented in a single software engine, in a plurality of software engines, in one or more hardwired components or in a combination of hardwired and software systems.

In addition to one or more software engines, non-volatile storage also includes one or more data storage areas. Data storage area is operably associated with the main memory and CPU. Data storage area of non-volatile storage may be leveraged to maintain data. Data storage area, or portions thereof, may also be utilized to store myriad other data.

A display may display images and data for the computer device 38. The display may be any suitable display, such as liquid crystal display (LCD), a light emitting diode (LED) based display, an organic light emitting diode (OLED) based display, a cathode ray tube (CRT) display, or an analog or digital television. In some embodiments, the display may function as a touch screen through which a user may interact with the computer device 38.

The computer device 38 may further include a user interface. The user interface may represent indicator lights and user input structures but may also include a graphical user interface (GUI) on the display. In practice, the user interface may operate via the CPU, using memory from the main memory and long-term storage in the nonvolatile storage. In an embodiment having a GUI, the user interface may provide interaction with interface elements on the display via certain user input structures, user input peripherals such as a keyboard or mouse, or a touch sensitive implementation of the display. The user may interact with the graphic user interface via touch means on a touch screen, input means via one or more keyboard buttons, mouse buttons etc., or voice instructions.

One or more communication interfaces may provide connectivity for the computer device 38. The communication interface may enable wired or wireless communication of data to and from the computer device 38.

Figure 4:
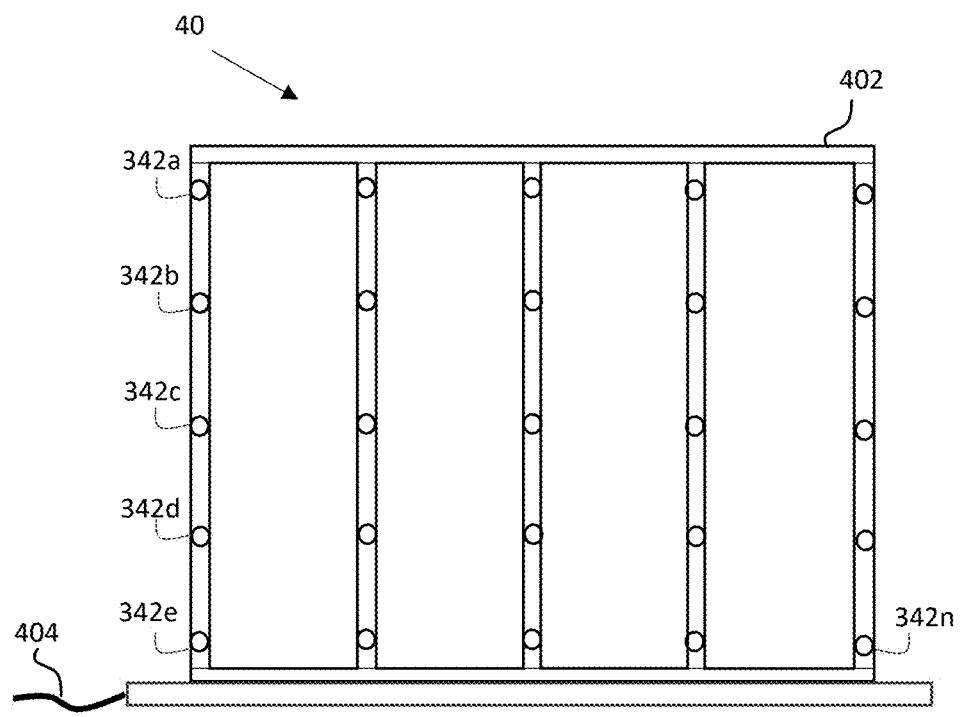
FIG. 4 shows a calibration point assembly of twenty-five (25) infrared calibration points, according to an illustrative embodiment.

FIG. 4 shows a calibration point assembly of twenty-five (25) infrared calibration points, according to an illustrative embodiment. The plurality of IR calibration points 342$a,n$ is spread over a relatively large calibration area 34 on a projected surface at a desired distance from the camera system 32. In one embodiment, a calibration assembly 40 comprises calibration points 342$a,n$ contained on a frame 402 which provides a surface for securing the calibration points. For example, the frame 402 may comprise a plurality of beams positioned in place at a desired distance. The calibration assembly may further comprise a connection 404 to a power source for the calibration points 342$a,n$, if required. In the embodiment shown in FIG. 4, the calibration assembly comprises twenty-five (25) IR calibration points 342. However, in other embodiments, the calibration assembly may comprise more than twenty-five or fewer than twenty-five calibration points but not fewer than the practical minimum of five points.

The calibration area 34 may be made as large as practical. In embodiments, the camera system 32 may be placed at a distance such that the array of calibration points 342$a,n$ occupies approximately eighty percent (80%) of the window. This distance allows for the movement of the calibration points 342$a,n$ when recording images to fully overlap and cover the entire camera system field of view. For example, when using a camera system 32 with a one hundred (100) millimeter (mm) lens, a suitable distance between the calibration beams and the camera system may be approximately fifty (50) meters (m). When using a camera system with a two hundred (200) mm lens, a suitable distance between the calibration beams and the camera system may be approximately one hundred (100) meters (m).

In one embodiment, the calibration points 342a,n are relatively small, illuminated heat sources which can be activated on demand and the precise location of which can be determined with surveying equipment, such as a survey theodolite 36. To achieve the highest accuracy in spatial calibration, the heat source must be: precise but also illuminate more than one pixel of the camera system so that a sub-pixel peak finding algorithm can be used to find the precise center of the heat source in recorded images; symmetric so that the sub-pixel fitting technique can accurately fit a Gaussian distribution to the local pixel intensities around each calibration point 342; accurately surveyable with a survey theodolite 36 so the true location of the calibration point 342 can be determined in 3D real world coordinates; persistent (not waver in intensity or quickly decline in intensity) and hotter than the surroundings, but not so hot so as to damage the calibration assembly components such as by melting the survey stickers.

Figure 5:
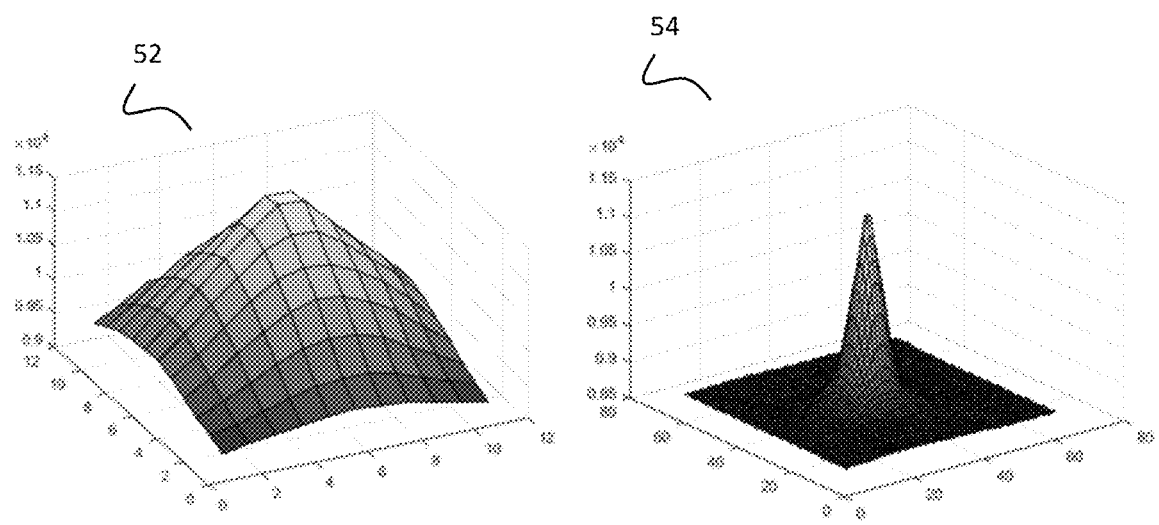
FIG. 5 shows a local peak intensity surface plot for a symmetric heat source and a wide view peak intensity surface plot of a symmetric heat source, according to an embodiment.

FIG. 5 shows a local peak intensity surface plot for a symmetric heat source and a wide view peak intensity surface plot of a symmetric heat source, according to an embodiment. Preferred distributions for local intensities around each calibration point 342 in the recorded digital images are illustrated in FIG. 5. A local peak intensity surface plot 52 and a wide view peak intensity surface plot 54 are shown. The wide view peak intensity surface plot 54 illustrates adequate contrast with the background. The high contrast of these distributions with the background allow for the use of automated digital processing means. Further, the symmetric shape allows their subpixel center to be identified through Gaussian fitting.

Figure 6A:
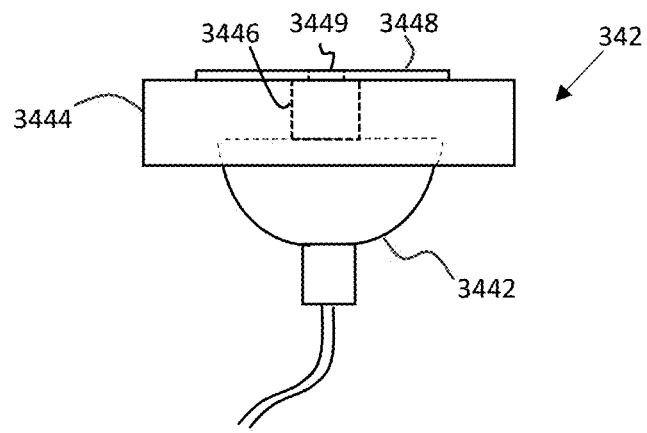
FIG. 6A is a side plan view of a twelve (12) Volt (V) halogen lamp with printed cap and survey sticker, according to an illustrative embodiment.
Figure 6B:
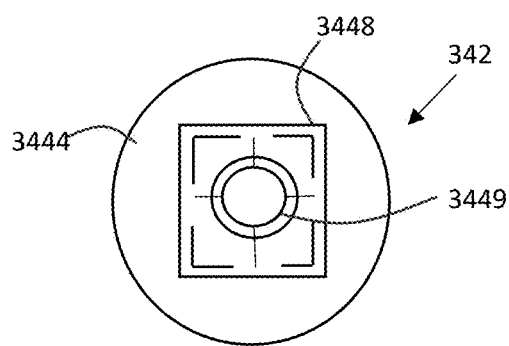
FIG. 6B is a front elevation view of a twelve (12) Volt (V) halogen lamp with printed cap and survey sticker, according to an illustrative embodiment.

FIG. 6A is a side plan view of a twelve (12) Volts (V) halogen lamp with printed cap and survey sticker, according to an illustrative embodiment. FIG. 6B is a front elevation view of a twelve (12) Volts (V) halogen lamp with printed cap and survey sticker, according to an illustrative embodiment. In one embodiment, the heat source is a halogen lamp 3442 covered with a cap 3444 that features a hole 3446 in the center. It was found that relatively small thirty-six (36) millimeter (mm) diameter twelve (12) Volt (V) lamps 3442 could be used with relatively inexpensive power sources and illuminated on demand. A forward surface of each lamp 3442 is covered with a cap 3444 comprising a hole 3446 in the center. In one embodiment, the cap 3444 is plastic and comprises a six (6) mm hole 3446 in the center. The cap 3444 serves several purposes. First, it provides a surface to accurately place a survey sticker 3448. Second, the cap 3444 reduces the size of the IR signature of the lamp 3442, thereby limiting overlap with adjacent lamps 3442 and confining the response to a smaller, more precise region of the image. A survey sticker 3448 with an opening 3449 located at its center is centered over the hole in the cap. In one embodiment, the survey sticker comprises an opening 3449 of three and two tenths (3.2) mm punched in the center of the survey sticker 3448.

The material and thermal properties of the cap 3444 must be adequate to prevent melting at the desired lamp wattage and to prevent overheating of the cap 3444 which would affect the shape of the intensity distribution. In one embodiment, the cap 3444 is made from plastic and more particularly from acrylonitrile butadiene styrene (ABS) plastic. The caps 3444 may be additively manufactured or manufactured through traditional means such as injection molding.

In one embodiment, a ten (10) Watt (W) twelve (12) V halogen lamp 3442 is used as the heat source of the calibration point 342. The ten (10) W lamps 3442 were found to provide sufficient contrast for indoor calibration as well as outdoor calibrations at a distance of more than one hundred (100) m from the camera system 32. In addition, it was found that for this wattage when used with an acrylonitrile butadiene styrene (ABS) plastic cap 3444, the shape and contrast produced by the lamps 3442 was excellent, thereby allowing the sub-pixel algorithm to exhibit good performance in finding the center of the light source as shown.

In other embodiments, twelve (12) V halogen lamps 3442 of higher wattage, such as thirty-five (35) W lamps and twenty (20) W lamps, may be used. However, the material and thermal properties of the cap 3444 must be adequate to prevent melting at these wattages and to prevent overheating of the cap 3444 which would affect the shape of the intensity distribution.

The size of the opening 3449 punched in the center of the survey sticker 3448 on the cap 3444 must be small enough to keep the lamp intensity precise but large enough to allow enough heat through to be provide sufficient signal/contrast at long distances. In addition, the opening 3449 must not be too large to affect the laser-distance measurement on the survey theodolite 36.

Figure 7:
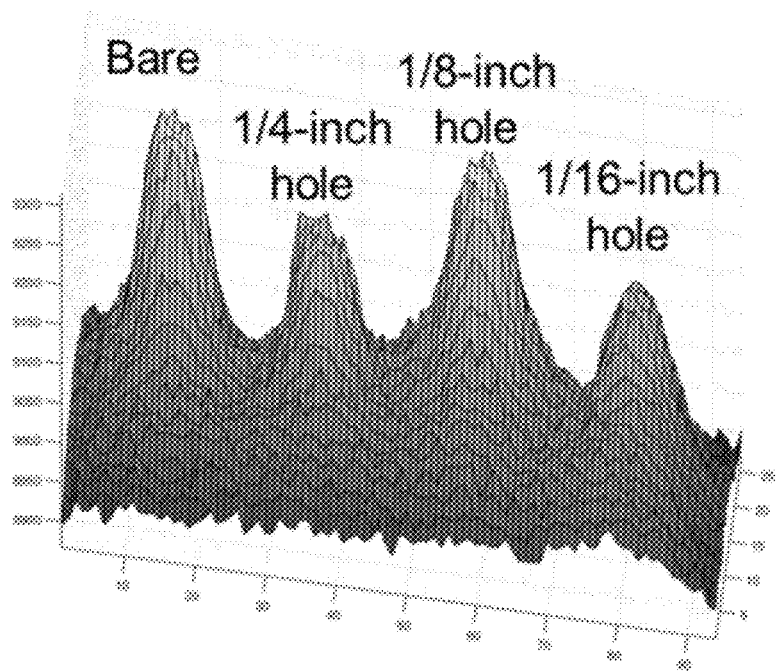
FIG. 7 shows intensity peak shape plots resulting from experiments on varying the size of the hole in the survey sticker, according to an illustrative embodiment.

FIG. 7 shows intensity peak shape plots resulting from experiments on varying the size of the opening in the survey sticker, according to an illustrative embodiment. In an embodiment, the survey sticker 3448 comprises a three and two tenths (3.2) mm opening 3449. Experiments showed that a three and two tenths (3.2) mm opening 3449 allowed for sufficient survey accuracy, provided a symmetric peak shape, and provided sufficient intensity to reach the camera system in indoor experiments. In outdoor experiments, it was confirmed that the three and two tenths (3.2) mm opening 3449 performed well at long distances for the 10 W lamps 3442.

In other embodiments, other heat sources may be used as calibration points 342a,n. For example, the calibration points 342a,n may comprise heat sources which comprise IR light emitting diodes (LEDs), a heated thermal mass, or IR chemical light sticks. In one embodiment, IR LEDs may be chosen which match the IR spectrum of the camera system 32 to be calibrated. In another embodiment, heated steel rivets may be used as a heat source. For example, rivets which are six (6) mm diameter by twenty-five (25) mm long had flat heads which accommodated ten (10) mm survey stickers. The rivets could be heated up under hot lamps or on a hotplate and had sufficient mass that they could maintain their temperature for five (5) to ten (10) minutes. In another embodiment, the calibration points 342a,n may be checkers, dots, circles, or any other similar shape out of a material which absorbs solar radiation such that its IR signature is higher than the background.

In embodiments wherein the camera system 32 to be calibrated is an optical light camera, the calibration points 342a,n may be simpler fiducials (such as bowtie markers), allowing the method to be used to calibrate daylight camera systems with long focus distances.

At step 1024, the camera system location is surveyed using the survey theodolite 36. In an embodiment of the invention, the gimbal system 322 supporting the focal point of the camera system 32 may also be equipped with an array of four survey stickers equidistant from the center of the gimbal which improves the precision (and confidence) of surveying the location of the focal point of the camera system 32. Since the focal point estimate is improved by the calibration process, a best guess effective focal point may be determined based on a pinhole camera model and knowledge of the sensor size and position. In calibrations conducted by the inventors, the effective focal length of a camera system 32 (at the desired focus distances) with both a one hundred (100) mm and a two hundred (200) mm infrared lenses, was within a few millimeters of the nominal lens focal length.

At step 1026, the calibration points 342a,n are surveyed by the survey theodolite 36. As discussed above, each of the calibration points 342a,n comprises a survey sticker placed on the front surface of the cap covering the heat source. Since this calibration method no longer restricts the placement of the calibration points 342a,n to two dimensions, additional degrees of freedom must be accounted for.

At step 1028, a plurality of static images is captured from the IR camera system 32 of the IR calibration points 342a,n. The heat sources are activated, and several hundred frames are recorded without moving the camera position.

At step 1030, another sequence of several hundred frames is recorded while the camera system is rotated on the gimbal system 322. The camera system 32 is rotated to fill the field of view with calibration points 342a,n. The gimbal system 322 allows the camera system 32 to rotate in two directions (pitch and yaw) and restricts the roll angle and all translational degrees of freedom.

Those skilled in the art will recognize that care must be taken to ensure that the calibration points 342a,n and camera system 32 do not move between the times that the survey is conducted, and the calibration sequences of images are recorded.

Figure 8:
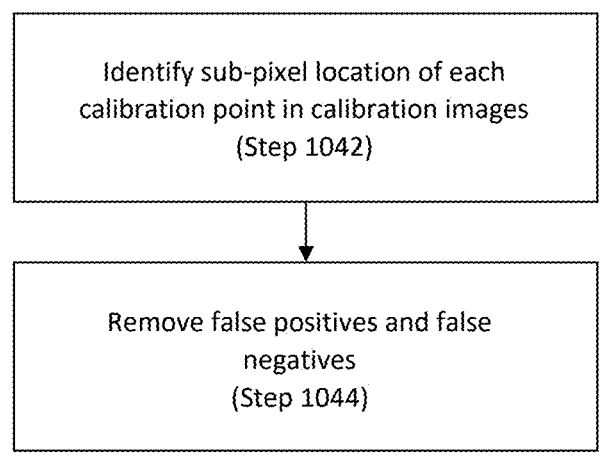
FIG. 8 is a flowchart illustrating a method for processing the recorded images, according to an embodiment.

FIG. 8 is a flowchart illustrating a method for processing the recorded images, according to an embodiment. At step 1042, the plurality of images is processed to identify the sub-pixel location of each calibration point 342. Once the calibration images are recorded, the images are processed to determine the sub-pixel location of each calibration point 342 for every image recorded. For example, the images may be processed using an automated computer vision algorithm for identifying sub-pixel location.

At step 1044, the plurality of images is processed to remove false positives and false negatives. Each location is sorted to make sure that the sequence (top to bottom for each beam and left to right from beam to beam) is correct and that no false positives or false negatives remain in the measurements.

Figure 9:
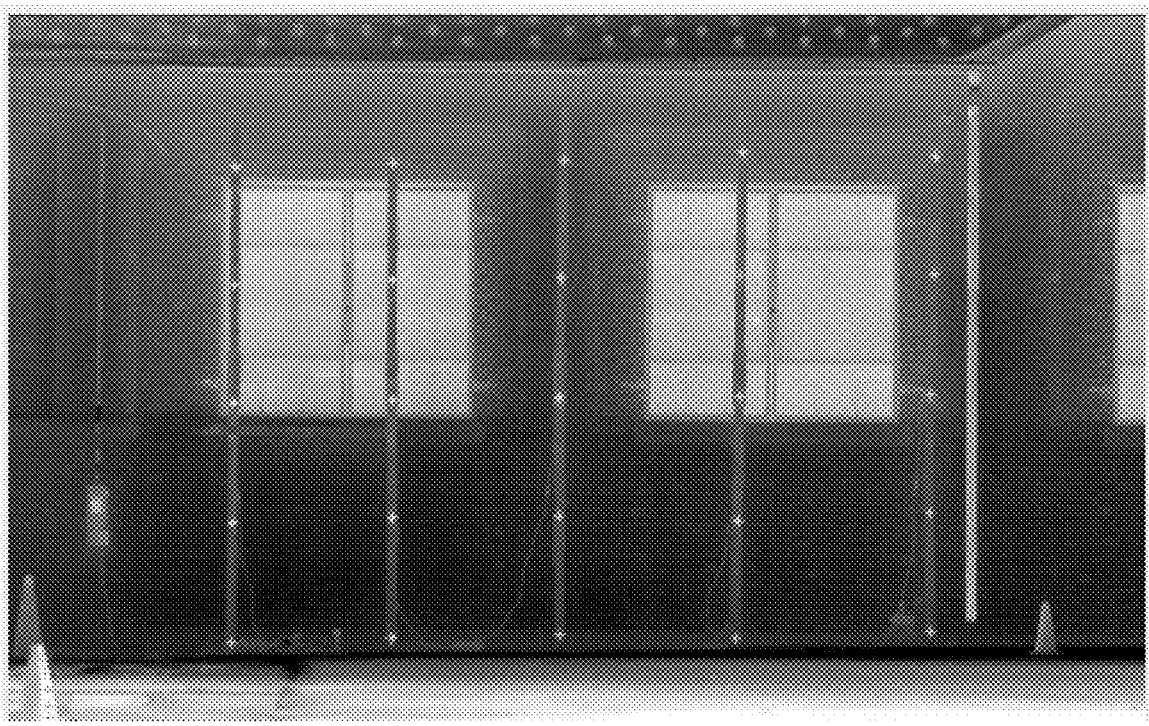
FIG. 9 is an image of recorded by a camera system with candidate calibration points identified, according to an illustrative embodiment.

FIG. 9 is an image recorded by a camera system with candidate calibration points identified, according to an illustrative embodiment. FIG. 9 shows an example of a digital image recorded during calibration with the sub-pixel center of the calibration points 342a,n identified. In the image, the identified calibration points are denoted with plus-signs. These pixel co-ordinates represent the distorted or uncorrected locations of the calibration points. The image of FIG. 9 shows false positive points were identified. As described above, at step 1044, false positives are removed.

Once the sub-pixel coordinates of all calibration points 342a,n has been determined for each image frame and the measured location, or true location, of all calibration markers has been surveyed, the camera calibration parameters for the camera system 32 to correct for distortion may be determined.

A distortion model for the camera system 32 comprises a radial distortion component and a tangential distortion component. The radial distortion is centered about a zero-distortion principal point, which may or may not be the center of the image. The formulas to correct for the radial components of the distortion model are $$x_{distorted} = x(1 + k_1 r^2 + k_2 r^4 + k_3 r^6) \quad \text{Eq 1}$$

$$y_{distorted} = y(1 + k_1 r^2 + k_2 r^4 + k_3 r^6) \quad \text{Eq 2}$$

where r is the root-sum-square distance (in pixels) from the principal point, and the k values are the coefficients of the model. Typically, as in the equation shown above, only two or three terms are used to describe the radial distortion. However, more than three terms may be used. The formulas to correct for the tangential components of the distortion are:

$$x_{distorted} = x + [2 p_1 y + p_2 (r^2 + 2x^2)] \quad \text{Eq 3}$$

$$y_{distorted} = y + [2 p_2 x + p_1 (r^2 + 2y^2)] \quad \text{Eq 4}$$

where $p_1$ and $p_2$ are the coefficients of the tangential distortion model. The tangential component can be added to the undistorted radial coordinate to determine the total distortion corrections.

To fit the distortion model, intrinsic parameters of the camera system 32 and the unknown extrinsic parameters need to be projected into a 2D coordinate system. In one embodiment, a quasi-2D coordinate system is used with dimensions of azimuth and elevation measured as angles from the camera system 32. This is not a true 2D Cartesian coordinate system as these angles are part of a spherical coordinate system. Accordingly, at elevations close to +/−90° the azimuth lines converge. Nonetheless, this method is acceptable in application where the field of view of the camera systems is relatively narrow.

For example, this method is acceptable for the application of object tracking where the camera system will remain oriented toward the horizon. In the embodiments described above in which the camera system comprises a one hundred (100) mm lens or a two hundred (200) mm lens, fields of view of eleven (11) degrees and five and five tenths (5.5) degrees, respectively, are acceptable. An added benefit of converting directly to azimuth and elevation is that these angles are the desired measurements for tracking applications.

The formulas for converting from 3D survey coordinates to azimuth (measure clockwise of east in an ENU convention) and elevation are $$\text{Azimuth} = \operatorname{atan}\left(\frac{P_N - C_N}{P_E - C_E}\right) \quad \text{Eq 5}$$

$$\text{Elevation} = \operatorname{asin}\left(\frac{P_U - C_U}{|P - C|}\right) \quad \text{Eq 6}$$

where the subscripts E, N, and U are the east, north, and up surveyed coordinates of the calibration point P and camera C position vectors.

An iterative fitting algorithm is employed to develop the complete transform from original (distorted) x and y image coordinates to a corrected azimuth and elevation. The pixel coordinates for each identified calibration point are provided. An inner loop optimizes for the individual extrinsic factors (roll, pitch, and yaw) of each frame. The measured pixel coordinates are used to calculate an error for each frame. An outer loop optimizes for the distortion model coefficients (k1, k2, k3, p1, p2) and camera intrinsic parameters (Fx, Fy and skew coefficient). A summed total of errors for all frames is utilized to optimize these parameters.

Together, the outer optimization seeks to optimize the distortion parameters and the intrinsic parameters of the camera system 32 for all the frames in the sequence of images, whereas the inner optimization determines the optimal extrinsic parameters for each individual frame. The initial values for the focal lengths of the first frame can be set to values determined by fitting a simple similarity transform (for the first frame only) which is conducted before the full sequence begins to be solved. For subsequent frames, the extrinsic values (camera orientation angles) from the previous frame are used as initial conditions.

The distorted pixel coordinates for each calibration point 342 are provided. A current guess for the distortion model is applied to all the distorted calibration point coordinates for all recorded image frames. Then, the corrected x and y coordinates of each of the calibration points 342a,n for each image are rotated by the current estimate for the roll angle ($\theta$) of the camera system 32. The rotation is done individually for each frame because each frame may have its own roll ($\theta$), pitch (Tel), and yaw (Taz) values if the camera system 32 was rotating. The resulting values are multiplied by the camera intrinsic matrix which contains a current estimate of the camera focal lengths in the x (Fx) and y (Fy) directions as well as a skew coefficient ($\gamma$), if desired. Once that is complete, the optimized pitch and yaw biases (Taz and Tel) are subtracted from all the angle coordinates for a given frame. This conversion is shown in the following formula as:

$$\begin{bmatrix} Az_1 & Az_2 & \cdots \\ El_1 & El_2 & \cdots \\ 1 & 1 & \cdots \end{bmatrix} = \begin{bmatrix} F_x & \gamma & T_{Az} \\ 0 & F_y & T_{El} \\ 0 & 0 & 1 \end{bmatrix} \begin{bmatrix} \cos\Theta & -\sin\Theta & 0 \\ \sin\Theta & \cos\Theta & 0 \\ 0 & 0 & 1 \end{bmatrix} \begin{bmatrix} x_1 & x_2 & \cdots \\ y_1 & y_2 & \cdots \\ 1 & 1 & \cdots \end{bmatrix} \quad \text{Eq 7}$$

This conversion for each point of each frame has a resulting distance error which is squared and added to the cumulative sum-squared error for all frames of the calibration sequence. The process is repeated using an optimization algorithm the resulting error is below an acceptable value. For example, a gradient descent, Newton's method, or trust region optimization algorithm may be employed. In an embodiment, a steepest descent optimization is employed. When this is reached, suitable estimates for the distortion model of the camera system 32, intrinsic parameters of the camera system 32, and the extrinsic parameters (roll, pitch, and yaw) for each frame have been calculated.

In one embodiment, the initial conditions for the skew coefficient and the parameters of the distortion models are set at zero. For the first frame of each analysis, the roll, pitch, and yaw angles may also be set to zero and are then allowed to be optimized in an inner optimization loop within the overall model-fitting optimization loop.

Figure 10:
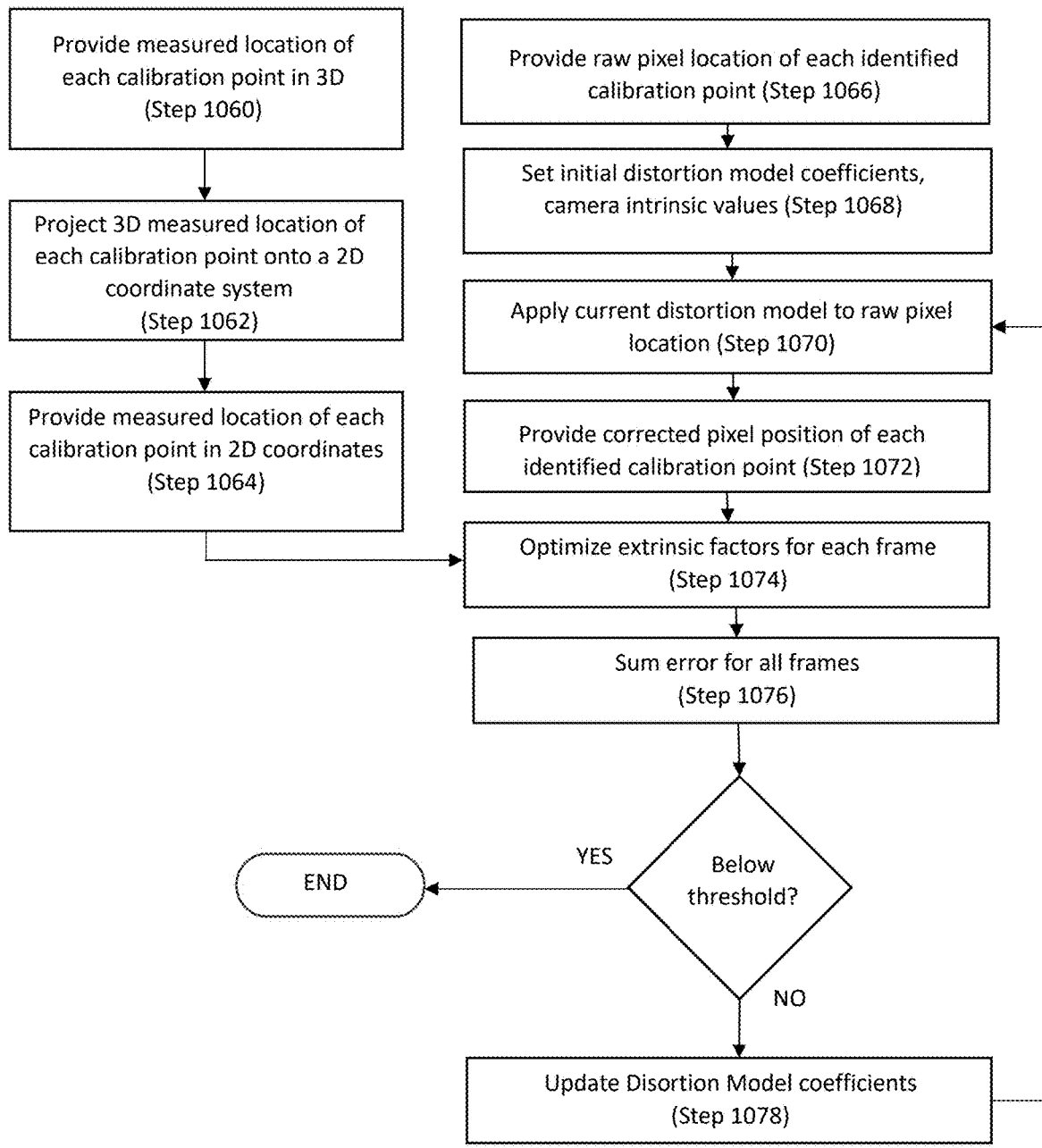
FIG. 10 is a flowchart illustrating a method for determining camera calibration parameters for the camera system, according to an embodiment.

FIG. 10 is a flowchart illustrating a method for determining camera calibration parameters for the camera system, according to an embodiment.

At step 1060, the measured three-dimensional (3D) coordinates of each calibration point 342 are provided. The "truth" location, or the measured location, of all calibration markers from the survey theodolite 36 has been determined in 3D real-world coordinates.

At step 1062, the measured 3D coordinates of each calibration point 342 is projected into a two-dimensional (2D) coordinate system. To fit the distortion model, intrinsic parameters of the camera system 32, and the unknown extrinsic parameters need to be projected into a 2D coordinate system. Accordingly, the measured location of the calibration markers must also be converted into a 2D coordinate system.

Figure 11:
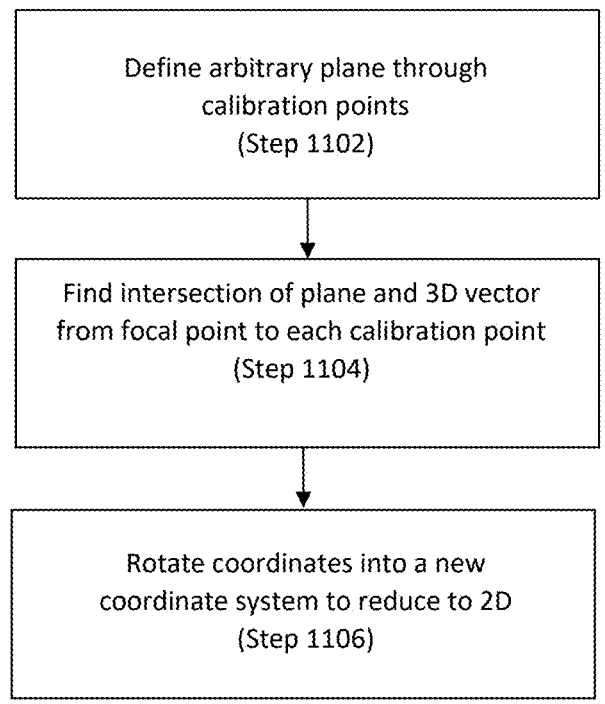
FIG. 11 is a flowchart illustrating a method for converting measured 3D coordinates into a 2D coordinate system, according to an embodiment.

FIG. 11 is a flowchart illustrating a method for converting measured 3D coordinates into a 2D coordinate system, according to an embodiment. In one embodiment, the 3D coordinates are converted into a 2D coordinate system by using an arbitrary 2D calibration plane.

At step 1102, an arbitrary plane is defined through the calibration points 342a,n.

At step 1104, the measured 3D coordinates of each calibration point 342 is projected onto the arbitrary plane by finding the intersection of the arbitrary plane and the 3D vector going from the camera focal point to the calibration point 342.

At step 1106, once all the measured calibration points have been projected onto the arbitrary plane, the coordinates are rotated into a new coordinate system to reduce the dimension of the calibration point coordinates from 3D to 2D.

Figure 12:
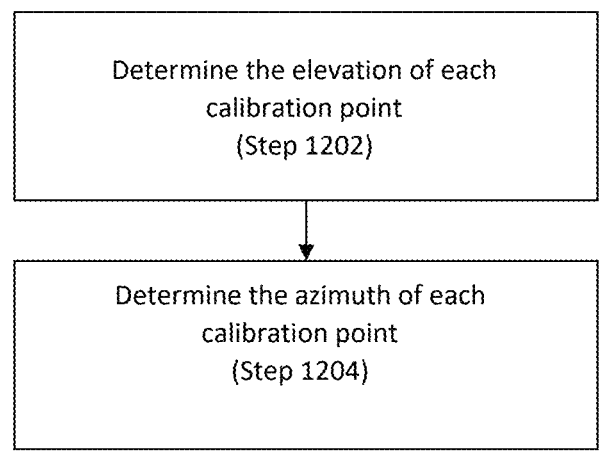
FIG. 12 is a flowchart illustrating a method for converting measured 3D coordinates into a 2D coordinate system, according to an embodiment.

FIG. 12 is a flowchart illustrating a method for converting measured 3D coordinates into a 2D coordinate system, according to an embodiment. In an alternative embodiment, the 3D measured locations of the calibration points are converted directly into a quasi-2D coordinate system with dimensions of azimuth and elevation measured as angles from the camera system 32. As described in further detail above, this is not a true 2D Cartesian coordinate system as these angles are part of a spherical coordinate system. However, this method is acceptable in application where the field of view of the camera system 32 is relatively narrow and the camera system 32 will remain oriented toward the horizon where convergence errors between azimuth lines is small.

At step 1202, the elevation of each calibration point 342 is determined.

At step 1204, the azimuth of each calibration point 342 is determined.

Returning to FIG. 10, at step 1064, the measured location of each calibration point in two-dimensional coordinates, azimuth, and elevation, are provided.

At step 1066, the pixel locations for distorted calibration points 342a,n for all frames are provided.

At step 1068, an initial guess of the distortion model coefficients and camera intrinsics (focal length and skew coefficient) is set. In one embodiment, the initial conditions for the skew coefficient and the parameters of the distortion models are set at zero. In one embodiment, the initial values for focal lengths of the first frame are set to values determined by fitting a simple similarity transform which is conducted before the full sequence is solved.

At step 1070, for each calibration point of each frame, the current distortion model is applied to the distorted pixel location to calculate a corrected calibration point location.

At step 1072, the corrected calibration point location for each calibration point is provided.

In an embodiment of the invention, step 1072 may further comprise the steps, for the plurality of static images, averaging the calculated location of each calibration point and providing this average calculated position.

At step 1074, for each individual frame, the extrinsic properties are optimized in an inner loop. The inner loop determines the optimal extrinsic parameters for each individual frame.

Figure 13:
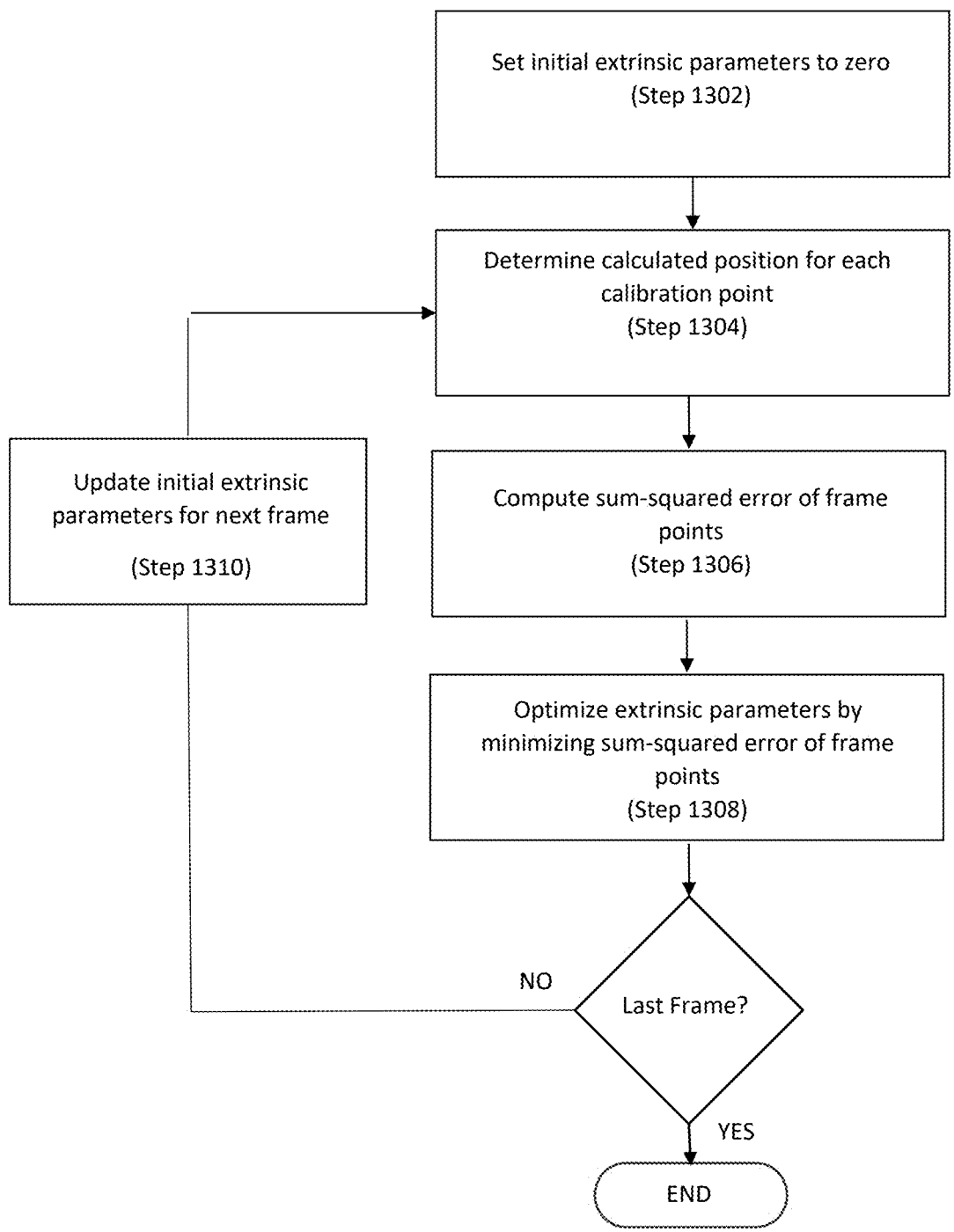
FIG. 13 is a flowchart illustrating a method for optimizing the extrinsic properties of each individual frame, according to an embodiment.

FIG. 13 is a flowchart illustrating a method for optimizing the extrinsic properties of each individual frame, according to an embodiment.

At step 1302, for the initial frame, the extrinsic parameters of roll, pitch, and yaw angles, are initially set to zero.

At step 1304, a calculated azimuth and elevation is calculated for each calibration point 342 in that frame using the current transform.

At step 1306, an error metric is computed for the frame using the calculated azimuth, calculated elevation, measured azimuth and measured elevation for each point. In one embodiment, the error metric is a mean reprojection error (MRE). However, other error metrics may be utilized, such as maximum sum-squared error. In these embodiments, a sum-squared error (SSE) of frame points is computed using the calculated azimuth and elevation and the measured azimuth and elevation. The following equation may be used to compute the sum-squared error:

$$E = \text{SUM}([Az-Az']^2 + [El-El']^2)$$

From the sum-squared errors (SSE), root sum squared errors (RSS) may be computed as the square root of the sum square error. In turn, the mean reprojection error (MRE) is computed as the average of the root sum-squared (RSS) errors.

At step 1308, the mean reprojection error (MRE) is minimized until the extrinsic parameters are optimized for that frame.

At step 1310, for the subsequent frame, the optimized extrinsic parameters of the previous frame are used as the initial extrinsic parameters.

Step 1304 through step 1310 are repeated for all frames.

Returning to FIG. 10, at step 1076, an error metric is computed for all frames using the optimized extrinsic parameters from each frame. In one embodiment, the error metric is the mean reprojection error (MRE). However, other metrics may be utilized such as maximum sum-squared error.

In one embodiment, a sum-squared error (SSE) for each frame is computed using the optimized extrinsic parameters from each frame. From the sum-squared errors (SSE), root sum squared (RSS) errors may be computed as the square root of the sum square error (SSE). In turn, the mean reprojection error (MRE) is computed as the average of the RSS errors.

The overall reprojection error is minimized until the distortion and intrinsic parameters are optimized. At step 1078, if the overall reprojection error is not below a predefined threshold, the distortion model coefficients are updated in the current distortion model and steps 1070 through 1078 are repeated until the overall reprojection error is below a predefined threshold.

While the invention has been described with reference to certain embodiments, numerous changes, alterations, and modifications to the described embodiments are possible without departing from the spirit and scope of the invention as defined in the appended claims, and equivalents thereof.

The invention claimed is:

1. A method for conducting spatial calibration of an infrared camera system comprising steps of:
   providing an infrared camera system and a plurality of infrared source points at a desired distance from the camera system;
   surveying a measured location for each of the plurality of infrared source points;
   recording a plurality of calibration images with the infrared camera system;
   processing the plurality of calibration images to identify relevant information within the calibration image;
   determining a camera calibration parameter from the relevant information of the processed calibration images and the measured location of the infrared camera system and the measured location of each of the plurality of infrared source points; and,
   wherein the each of the plurality of infrared source points comprises a halogen lamp, said halogen lamp further comprising a front surface covered by a cap, said cap defining a circular central hole extending longitudinally through the cap to the front surface of the halogen lamp, wherein said central hole is covered by a survey sticker having a circular opening axially aligned with the central hole of the cap.

2. The method of claim 1 wherein
   the halogen lamp is a thirty-six millimeter diameter twelve Volt 10 Watt halogen lamp;
   the cap is comprised of acrylonitrile butadiene styrene (ABS) plastic and the central hole has a diameter of six millimeters; and
   the opening in the survey sticker has a diameter of three and two tenths millimeters.

3. The method of claim 1 wherein the plurality of calibration points is at a distance from the infrared camera system such that the plurality of calibration points occupies eighty percent of a camera field of view.

4. The method of claim 1 wherein the camera system is supported on a gimbal system at an effective focal point of the camera system and the step of surveying a location of the camera system comprises surveying locations of four surveying stickers placed equidistant from a center of the gimbal system.

5. The method of claim 1 wherein the step of recording a plurality of calibration images by the camera system further comprises recording a plurality of static frames of the calibration points.

6. The method of claim 1 wherein the step of recording a plurality of calibration images further comprises recording a plurality of dynamic frames while rotating a pitch and a yaw of the camera system.

7. The method of claim 1 wherein the step of processing the plurality of the calibration images to identify relevant information within the calibration image further comprises the steps of: determining a sub-pixel location of each calibration point for each image recorded and removing any false positive results and false negative results from the determinations.

8. The method of claim 1 wherein:
   the method further comprises the step of converting the measured location for each of the plurality of calibration points from a surveyed coordinate system to an azimuth and elevation coordinate system;
   the step of determining a camera calibration parameter from the relevant information of the processed calibration images and the measured location of the camera system and the measured location of each of the plurality of calibration points further comprises determining a calibration transform which corrects for a radial distortion component and a tangential distortion component of the camera system; and
   wherein the step of determining a camera calibration parameter further comprises the step of employing an iterative fitting algorithm, said iterative fitting algorithm comprising an inner loop for optimizing extrinsic factors for each individual image of the plurality of calibration images and an outer loop for optimizing distortion model coefficients of the camera system and one or more intrinsic factors of the camera system.

9. The method of claim 8 further comprising the steps of:
setting an initial guess at the one or more intrinsic factors of the camera system;
setting an initial guess at the distortion model coefficients;
providing a calculated location of each identified calibration point for each image of the plurality of calibration images;
for each individual image, optimizing the extrinsic parameters for the individual image by minimizing an error between a location of the measured calibration points and a location of the calculated calibration points below a first threshold;
calculating a summed error for the plurality of calibration images; and
optimizing the intrinsic parameters of the camera system by minimizing a reprojection error of the summed error below a second threshold.

10. The method of claim 9 wherein the step of optimizing the optimizing the extrinsic parameters for the individual image by minimizing an error between a location of the measured calibration points and a location of the calculated calibration points below a first threshold further comprises the steps of:
setting an initial guess for the extrinsic factors for a first image as zero for each factor;
for the first image, optimizing the extrinsic parameters of the individual image by minimizing an error between a location of the measured calibration points and a location of the calculated calibration points below a first threshold; and
for each subsequent image, setting an initial guess for the extrinsic factors of the image as the optimized extrinsic factors of the preceding image and optimizing the extrinsic parameters of the individual image by minimizing an error between a location of the measured calibration points and a location of the calculated calibration points below a first threshold.

11. The method of claim 8 wherein the extrinsic factors comprise a roll measurement, a pitch measurement, and a yaw measurement for each frame.

12. The method of claim 8 wherein the intrinsic factors comprise a focal length and a skew coefficient.

13. The method of claim 8 wherein the distortion model parameters comprise a principal point coordinate, one or more radial distortion coefficients and one or more tangential distortion coefficients.

* * * * *